United States Patent
Le et al.

(10) Patent No.: US 10,955,245 B2
(45) Date of Patent: Mar. 23, 2021

(54) SYSTEM AND METHOD FOR LOW LATENCY, HIGH PERFORMANCE POSE FUSION

(71) Applicant: Samsung Electronics Co., Ltd., Suwon-si (KR)

(72) Inventors: Long Le, Richardson, TX (US); Vitali Loseu, Irving, TX (US); Sourabh Ravindran, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/399,977

(22) Filed: Apr. 30, 2019

(65) Prior Publication Data

US 2020/0348138 A1 Nov. 5, 2020

(51) Int. Cl.
| | | |
|---|---|---|
| *G06T 7/00* | (2017.01) | |
| *G01C 21/16* | (2006.01) | |
| *G06T 7/70* | (2017.01) | |
| *G01P 13/00* | (2006.01) | |
| *G06F 3/14* | (2006.01) | |
| *G06T 7/20* | (2017.01) | |

(52) U.S. Cl.
CPC ............ *G01C 21/165* (2013.01); *G01P 13/00* (2013.01); *G06F 3/14* (2013.01); *G06T 7/20* (2013.01); *G06T 7/70* (2017.01)

(58) Field of Classification Search
None
See application file for complete search history.

(56) References Cited

U.S. PATENT DOCUMENTS

| | | | |
|---|---|---|---|
| 7,015,831 B2 | 3/2006 | Karlsson et al. | |
| 8,542,250 B2* | 9/2013 | Baseley | G06T 19/00 |
| | | | 345/633 |
| 8,543,241 B2 | 9/2013 | Hong et al. | |
| 8,970,690 B2 | 3/2015 | Meier et al. | |
| 9,071,829 B2 | 6/2015 | Michot et al. | |

(Continued)

FOREIGN PATENT DOCUMENTS

| | | |
|---|---|---|
| WO | 2017/155970 A1 | 9/2017 |
| WO | 2018048353 A1 | 3/2018 |
| WO | 2019/043233 A1 | 3/2019 |

OTHER PUBLICATIONS

International Search Report in connection with International Patent Application No. PCT/KR2019/014603 dated Feb. 7, 2020, 3 pages.

(Continued)

*Primary Examiner* — Martin Mushambo

(57) ABSTRACT

An electronic device, method, and computer readable medium for accurate, low latency pose fusion architecture for SLAM are provided. The electronic device includes an IMU sensor, a camera, a display, and a processor coupled to the IMU sensor, the camera, and the display. The processor determines a vision pose in a camera coordinate based on the captured vision data; transforms the vision pose from the camera coordinate to an IMU coordinate; applies a scale factor, based on a combination of the vision pose and an IMU pose in the IMU coordinate, to the vision pose; fuses the scaled vision pose and the IMU pose into a fused pose in a temporally distributed manner; and outputs the fused pose for use with the display.

20 Claims, 14 Drawing Sheets

No correction, slower convergence

With correction, faster convergence

(56) References Cited

U.S. PATENT DOCUMENTS

| | | | |
|---|---|---|---|
| 9,123,135 B2 | 9/2015 | Ramanandan et al. | |
| 9,131,220 B2* | 9/2015 | Givon | H04N 13/218 |
| 9,159,133 B2 | 10/2015 | Ramanandan et al. | |
| 9,898,866 B2 | 2/2018 | Fuchs et al. | |
| 2005/0234679 A1 | 10/2005 | Karlsson | |
| 2014/0126769 A1* | 5/2014 | Reitmayr | G06T 7/73 |
| | | | 382/103 |
| 2015/0172626 A1* | 6/2015 | Martini | G06K 9/46 |
| | | | 348/50 |
| 2016/0148433 A1* | 5/2016 | Petrovskaya | G06T 19/006 |
| | | | 345/633 |
| 2016/0350906 A1* | 12/2016 | Meier | G06T 7/579 |
| 2017/0124693 A1 | 5/2017 | Ramalingam et al. | |
| 2018/0108179 A1 | 4/2018 | Tomlin et al. | |
| 2018/0189587 A1* | 7/2018 | Mandal | G06K 9/00664 |
| 2018/0364731 A1* | 12/2018 | Liu | G06T 1/20 |
| 2018/0365840 A1* | 12/2018 | Shaked | G02B 27/0093 |
| 2019/0096068 A1* | 3/2019 | Fontanel | G06T 7/20 |
| 2019/0096081 A1* | 3/2019 | Gupta | G06T 5/00 |

OTHER PUBLICATIONS

Written Opinion of the International Searching Authority in connection with International Patent Application No. PCT/KR2019/014603 dated Feb. 7, 2020, 5 pages.

\* cited by examiner

SYSTEM AND METHOD FOR LOW LATENCY, HIGH PERFORMANCE POSE FUSION

TECHNICAL FIELD

This disclosure relates generally to systems for image and video processing. More specifically, this disclosure relates to an accurate, low latency pose fusion architecture for simultaneous localization and mapping (SLAM).

BACKGROUND

Existing tightly-coupled SLAM solutions have high latency and high power consumption. The high latency of the SLAM solutions is typically hidden by the smartphone's preview delay. Existing loosely-coupled SLAM solutions have slightly reduced latency and power consumption, but even then the accuracy and performance needs further improvement.

SUMMARY

In one embodiment, an electronic device provides for accurate, low latency pose fusion architecture for SLAM. The electronic device includes an IMU sensor, a camera, a display, and a processor coupled to the IMU sensor, the camera, and the display. The processor determines a vision pose in a camera coordinate based on the captured vision data; transforms the vision pose from the camera coordinate to an IMU coordinate; applies a scale factor, based on a combination of the vision pose and an IMU pose in the IMU coordinate, to the vision pose; fuses the scaled vision pose and the IMU pose into a fused pose in a temporally distributed manner; and outputs the fused pose for use with the display.

In a second embodiment, a method provides for accurate, low latency pose fusion architecture for SLAM. The method includes determining a vision pose in a camera coordinate based on the captured vision data; transforming the vision pose from the camera coordinate to an IMU coordinate; applying a scale factor, based on a combination of the vision pose and an IMU pose in the IMU coordinate, to the vision pose; fusing the scaled vision pose and the IMU pose into a fused pose in a temporally distributed manner; and outputting the fused pose for use with the display.

In a third embodiment, a non-transitory medium embodying a computer program provides for accurate, low latency pose fusion architecture for SLAM. The program code, when executed by at least one processor, causes a processor to determine a vision pose in a camera coordinate based on the captured vision data; transform the vision pose from the camera coordinate to an IMU coordinate; apply a scale factor, based on a combination of the vision pose and an IMU pose in the IMU coordinate, to the vision pose; fuse the scaled vision pose and the IMU pose into a fused pose in a temporally distributed manner; and output the fused pose for use with the display.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
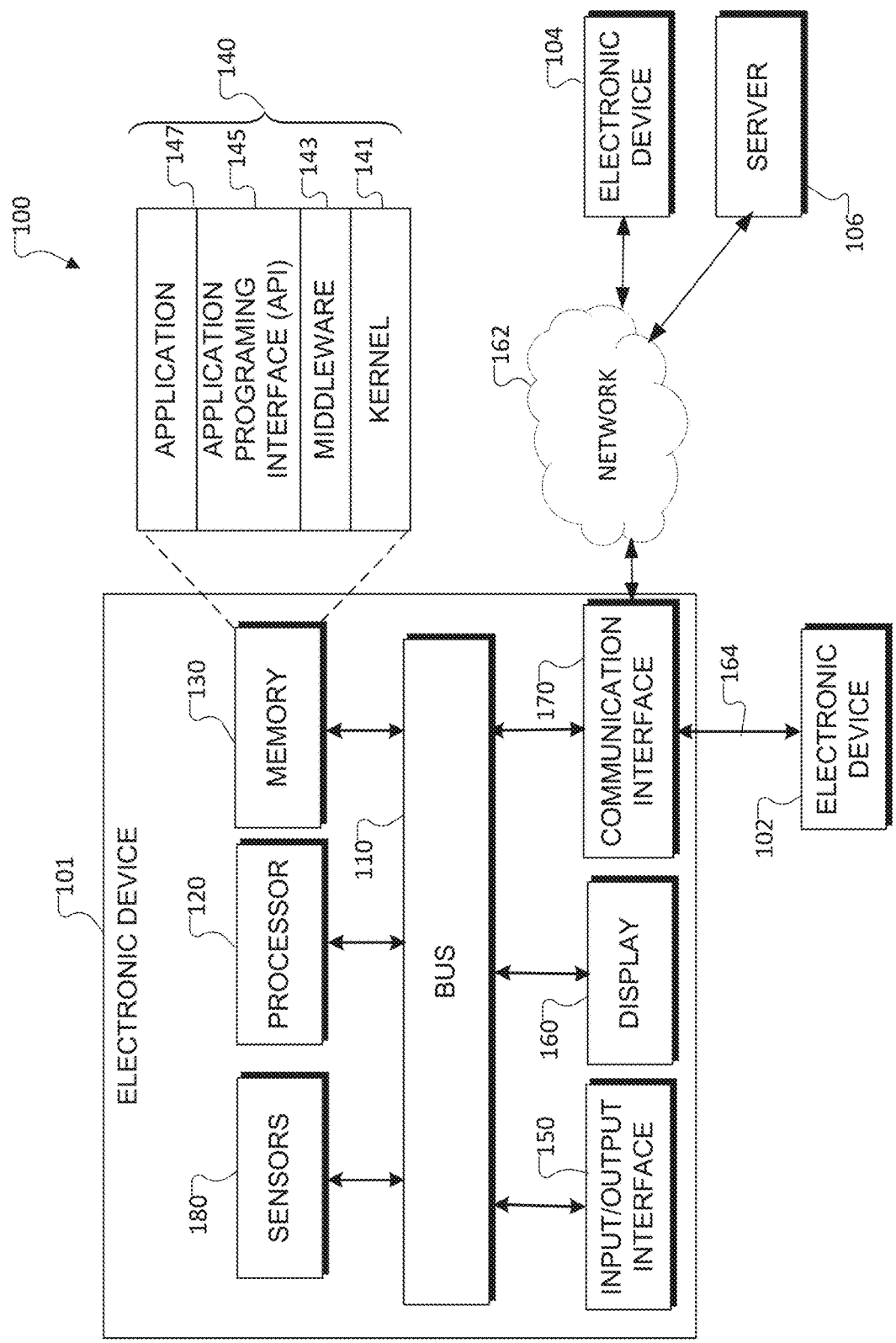
FIG. 1 illustrates an example network configuration according to embodiments of the present disclosure.

FIGS. 1 through 19C, discussed below, and the various embodiments of the present disclosure are described with reference to the accompanying drawings. However, it should be appreciated that the present disclosure is not limited to the embodiments and all changes and/or equivalents or replacements thereto also belong to the scope of the present disclosure. The same or similar reference denotations may be used to refer to the same or similar elements throughout the specification and the drawings.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, APPLE TV™, or GOOGLE TV™), a gaming console (XBOX™, PLAYSTATION™), an electronic dictionary, an electronic key, a camcorder, or an electronic picture frame.

According to certain embodiments of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MM) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

SLAM is for a camera system to simultaneously globalize itself within the world and mapping of the world. Two types of SLAM can be used, which are tightly coupled and loosely coupled. Tightly coupled SLAM has the general property of high latency and high power consumption from the processing capturing video streams or images at a high rate.

As discussed above, smartphones' preview delay hides any noticeable latency issues that occur with tightly-coupled SLAM solutions. On the other hand, smart glasses have zero latency because of transparent displays and have highly constrained batteries Loosely-coupled SLAM provides for low latency and low power consumption, but generally have lower accuracy and lower performance.

FIG. 1 illustrates an example network configuration 100 according to various embodiments of the present disclosure. The embodiment of the network configuration 100 shown in FIG. 1 is for illustration only. Other embodiments of the network configuration 100 could be used without departing from the scope of this disclosure.

According to an embodiment of the present disclosure, an electronic device 101 is included in a network environment 100. The electronic device 101 may include at least one of a bus 110, a processor 120, a memory 130, an input/output (IO) interface 150, a display 160, a communication interface 170, or sensors 180. In some embodiments, the electronic device 101 may exclude at least one of the components or may add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 can receive a plurality of frames captured by the camera during a capture event. The processor 120 can identify a salient region in each of the plurality of frames. The processor 120 can determine a reference frame from the plurality of frames based on the identified salient regions. The processor 120 can fuse non-reference frames with the determined reference frame into a completed frame. The processor 120 can operate the display to display the completed frame.

The memory 130 can include a volatile and/or non-volatile memory. For example, the memory 130 can store commands or data related to at least one other component of the electronic device 101. According to an embodiment of the present disclosure, the memory 130 can store software and/or a program 140. The program 140 includes, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 134.

The API 145 is an interface allowing the application 147 to control functions provided from the kernel 141 or the middleware 143. For example, the API 145 includes at least one interface or function (e.g., a command) for filing control, window control, image processing, or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams.

Electronic device 101 further includes one or more sensors 180 that can meter a physical quantity or detect an activation state of the electronic device 101 and convert metered or detected information into an electrical signal. For example, sensor 180 may include one or more buttons for touch input, a camera, an inertial measurement unit (IMU) sensor, a gesture sensor, a gyroscope or gyro sensor, an air pressure sensor, a magnetic sensor or magnetometer, an acceleration sensor or accelerometer, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) 180 can further include a control circuit for controlling at least one of the sensors included therein. Any of these sensor(s) 180 may be located within the electronic device 101. A camera sensor 180 can capture a plurality of frames for a single image to be combined by the processor 120.

The first external electronic device 102 or the second external electronic device 104 may be a wearable device or an electronic device 101-mountable wearable device (e.g., a head mounted display (HMD)). When the electronic device 101 is mounted in a HMD (e.g., the electronic device 102), the electronic device 101 is able to detect the mounting in the HMD and operate in a virtual reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving with a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (Wi-Bro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks, e.g., a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used.

Although FIG. 1 shows that the electronic device 101 includes the communication interface 170 to communicate with the external electronic device 104 or server 106 via the network 162, the electronic device 101 may be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
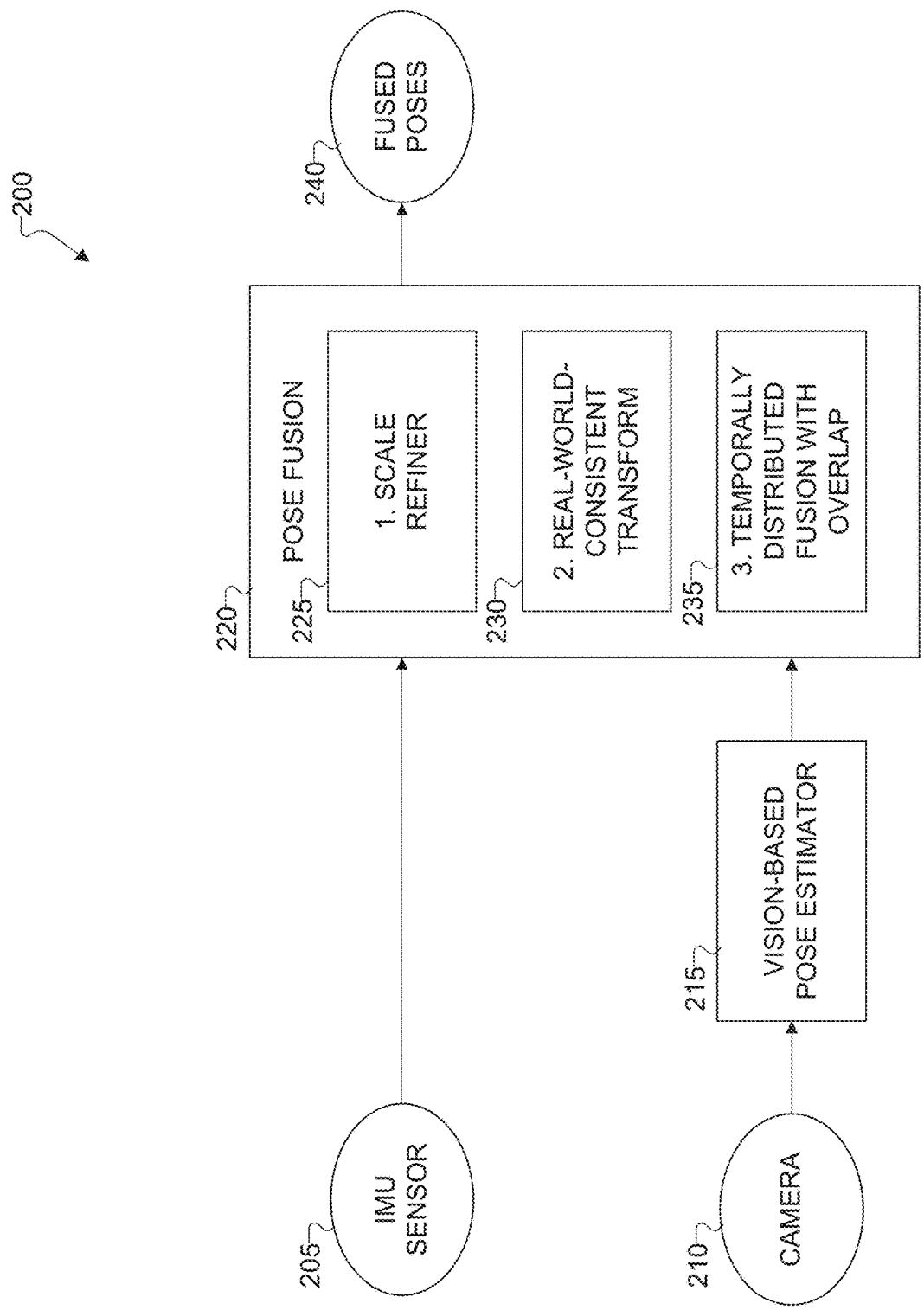
FIG. 2 illustrates an exemplary low-latency, high performance SLAM architecture according to embodiments of the present disclosure.

FIG. 2 illustrates an exemplary low-latency, high performance SLAM architecture 200 according to embodiments of the present disclosure. The embodiment of the exemplary low-latency, high performance SLAM architecture 200 shown in FIG. 2 is for illustration only. Other embodiments of an exemplary low-latency, high performance SLAM architecture could be used without departing from the scope of this disclosure.

The SLAM architecture 200 can include an IMU sensor 205, a camera 210, and one or more processors for performing the functions of a vision-based pose estimator 215 and a pose fusion 320 that includes a scale refiner 325, a real-world consistent transform 330, and a temporally distributed fusion with overlap 335. The architecture 200 outputs the fused poses 340.

The SLAM architecture 200 can utilize a loosely-coupled SLAM to provide a low latency for devices such as smart glasses or other transparent displays. Because the display is transparent, latency is a high concern. The greater amount of time required for processing of images/data effects the display of relevant concurrent data in the transparent display. High latency affects the difference in the displayed frame and the view image.

The IMU sensor 205 measures linear acceleration of the electronic device based on changes in pitch, roll, and yaw. The linear acceleration can be used to determine a movement of the electronic device at a higher rate and using less processing power than other methods, such as analyzing objects in sequential images. The IMU sensor 205 outputs movement data to the pose fusion 220 processor.

The camera 210 of the architecture can include multiple cameras 210. The camera captures an image of the object in front of the transparent display. The camera 210 outputs an image or video frame to the vision-based pose estimator 215.

The pose estimator 215 can determine a position and orientation of the camera 210 based on the receive image or video frames. An initial position and orientation can be determined based on many factors including readings from other sensors, generally identifiable objects in a frame, such as a horizon or celestial body. The initial position and orientation for a vision pose is normally based on a set of coordinates of the camera at the time the first frame is captured.

The pose estimator 215 identifies one or more specific objects or points of interest in a frame for use with the initial position and orientation of the camera or the device that the camera is mounted. In sequential frames, the pose estimator 215 can determine movement of the initial position or orientation based on the changes in the specific objects or points of interest between the sequential frames.

As the location and orientation of the camera changes, the objects and points of interest may no longer be easily identified or are moved out of the frame. The pose estimator 215 continues to identify new objects as the initial position and orientation changes. In situations where all the objects of points of interest from a previous frame are lost, the pose estimator 215 can determine that the position and orientation are lost. Once the position and orientation is lost, the pose estimator can determine a brand new set of specific objects or point of interests to determine the pose.

The vision-based pose output of the vision-based pose estimator 215 is sent to the pose fusion 220. The output of the vision-based pose estimator 215 can include the initial position, the initial position, a new position, a new orientation, a change in position, a change in orientation, etc.

The pose fusion 220 receives the output movement data from the IMU sensor 205 and the vision-based pose output from the vision-based pose estimator 215. The pose fusion 220 uses a scale refiner 225, a real-world consistent transform 230 and a temporally distributed fusion with overlap 235 to produce the fused poses 240. An IMU sensor 205 can produce an update for movement much more quickly than the vision-based pose estimator 215 using an output for the camera 210. Thus, the movement data from the IMU sensor 205 can fused with the image data from the camera 210 and the vision-based pose estimator 215 to more quickly and frequently update the pose of the device. The pose fusion 220 thus helps maintain an accurate, low-latency fused poses even at a reduced-rate vision pose.

The scale refiner 225 provides metric scale accuracy for vision poses. The real-world consistent transform 230 can gracefully handle the re-initialization strategy of vision SLAM during tracking loss. The temporally distributed fusion 235 with overlap can provide for accurate and low-latency output poses. The combination of the scale refiner 225, the real-world consistent transform 230 and the temporally distributed fusion 235 can provide a fused pose 240 at a rate equal to the IMU sensor 205, which is much more quick and frequent that the output received from the camera 210.

Figure 3:
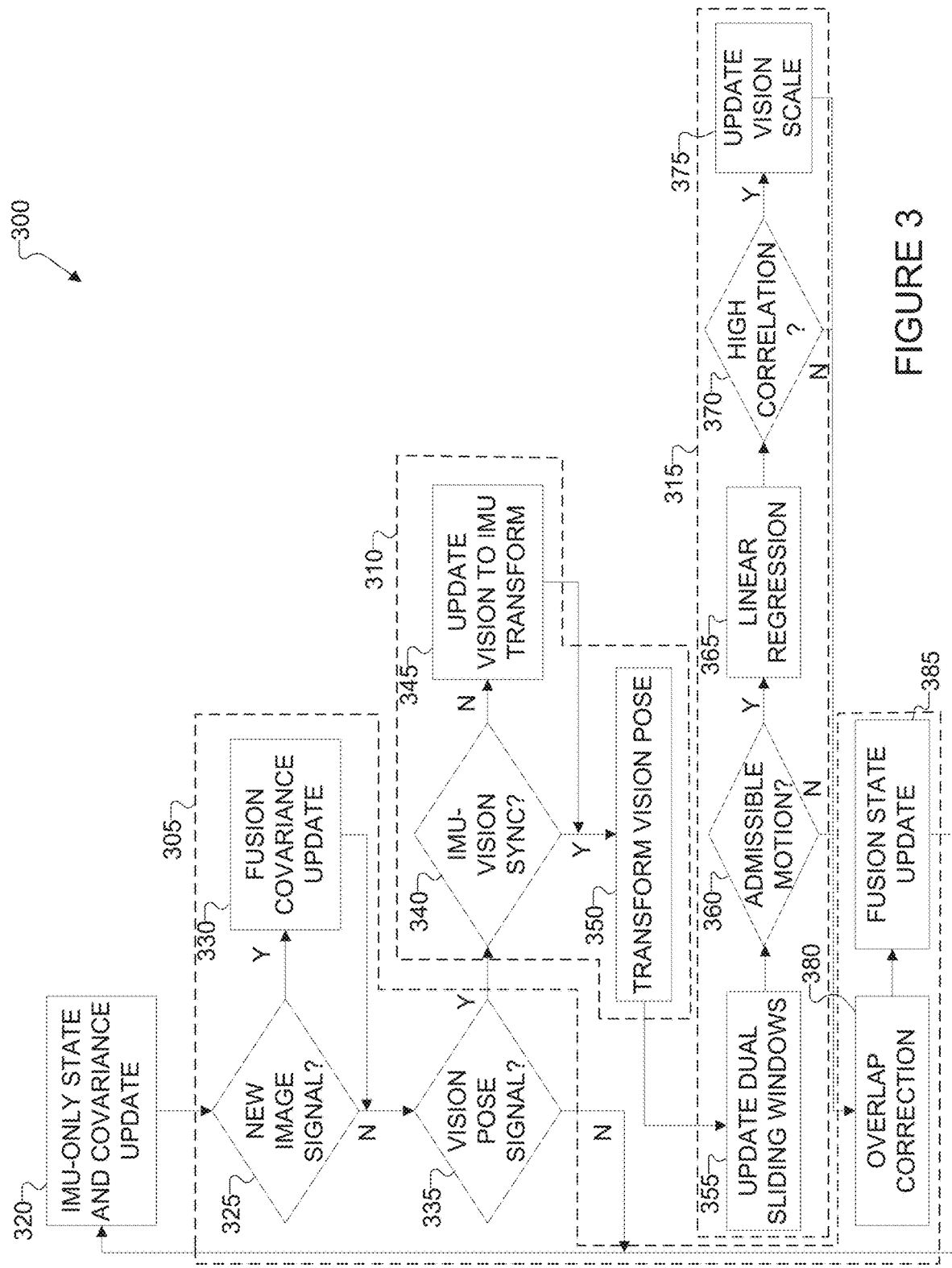
FIG. 3 illustrates a flow chart for pose fusion according to embodiments of the present disclosure.

FIG. 3 illustrates a flow chart 300 for pose fusion according to embodiments of the present disclosure. The embodiment of the pose fusion flow chart 300 shown in FIG. 3 is for illustration only. Other embodiments of an exemplary pose fusion flow chart could be used without departing from the scope of this disclosure. The operations in FIG. 3 could be performed by the electronic device 101 in FIG. 1.

The flow chart 300 includes temporally distributed fusion operations 305, consistent transform operations 310, and scale refinement operations 315. The flow chart 300 provides operations for low-latency fused poses. The flow chart 300 provides for the operations performed by the pose fusion 220.

In operation 320, the electronic device 101 updates an IMU-only state and a covariance of the poses. The electronic device 101 can receive IMU data from the IMU sensor.

The temporally distributed fusion operations 305 perform the functions of the temporally distributed fusion 235. The temporally distributed fusion operations 305 include the operations 325-335, 380 and 385.

In operation 325, the electronic device 101 determines whether a new image signal is received. The image signal can also be interchanged with a frame of a video signal. The image signal can come from an optical sensor within the electronic device 101 or an external optical sensor. When a new image signal is detected the electronic device performs operation 330 and when the image signal is not detected the electronic device performs operation 335.

In operation 330, the electronic device 101 updates a fusion covariance when it is determined that a new image signal is received in operation 365. The fusion covariance update is described in greater detail in relation to FIGS. 12-14.

In operation 335, the electronic device 101 determines whether a vision pose signal has been received. When a new vision pose signal is received, the electronic device continues to perform operation 340. When a new vision pose signal is not received, the electronic device continues to perform operation 360. The vision posed is determined in a camera coordinate based on the captured vision data.

The consistent transform operations 310 perform the functions of the real-world consistent transform 230. The consistent transform operations 310 include operations 340-350.

In operation 340, the electronic device 101 determines whether the IMU data and the vision data are synchronized. When the IMU and vision data are synchronized, the electronic device performs operation 350. When the IMU and vision data are not synchronized, the electronic device performs operation 345.

In operation 345, the electronic device 101 updates the coordinates of the vision poses into real-world coordinates that correspond to the IMU poses. The real-world coordinates can be coordinates that are based off gravity. Greater detail of the coordinate updates is described in relation to FIGS. 5 and 6.

In operation 350, the electronic device 101 transforms the vision pose using the updated coordinates. The electronic device 101 transforms the vision pose from the camera coordinates to the IMU or gravity-based coordinates. Greater detail of the vision pose transform is described in relation to FIGS. 5 and 6.

When a vision tracking loss from an original camera coordinate occurs, the electronic device 101 maintains IMU tracking until vision tracking is re-initialized. A new camera coordinate is identified based on the re-initialized vision tracking. The electronic device 101 determines a transform equation between the new camera coordinate and the original camera coordinate and applies the transform equation to the vision pose after vision tracking is re-initialized.

The scale refinement operations 315 perform the functions of the scale refiner 225. The scale refinement operations 315 include operations 355-375.

In operation 355, the electronic device 101 updates dual sliding windows. The dual sliding windows refer to a first sliding window for the movement data received and a second sliding window for the vision data received. The sliding windows ensure that the received data is appropriately aligned. The dual sliding windows include an IMU delta translation and a vision delta translation. Translation pairs of the IMU delta translation and vision delta translation are admitted on a basis of having a same sign or direction to ensure a positive scale.

Figure 9:
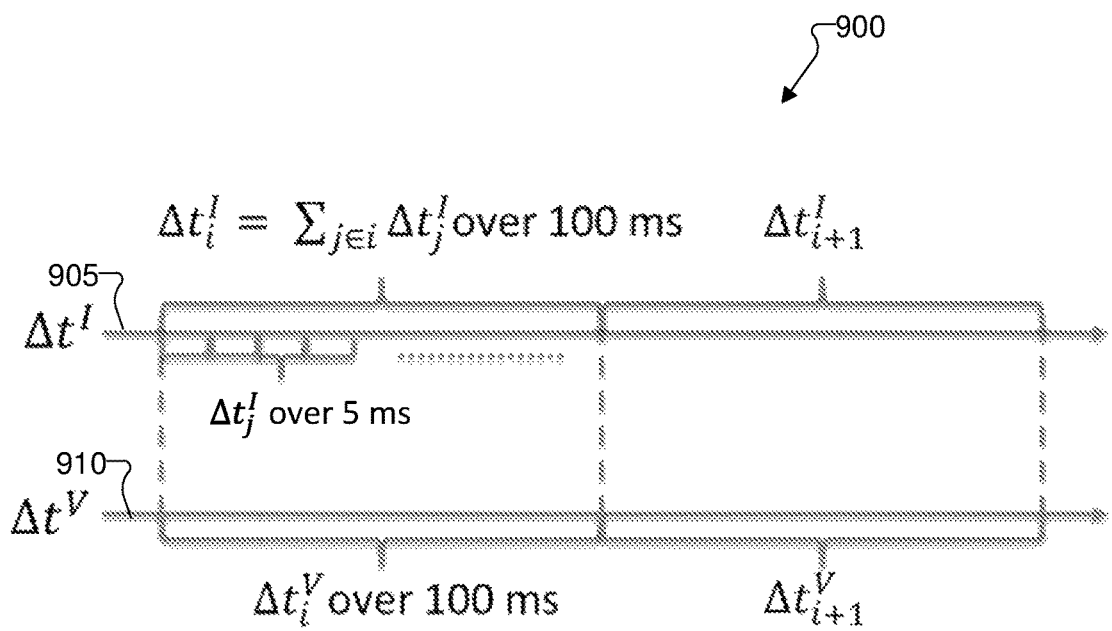
FIG. 9 illustrates an exemplary dual sliding windows for the scale refinement according to embodiments of the present disclosure.

The dual sliding windows are described in greater detail corresponding to FIG. 9.

In operation 360, the electronic device 101 determines whether the output from the transformed vision pose (discussed in operation 350) aligns within the IMU-only pose from operation 320. The electronic device 101 can admit translation pairs with a same sign to guarantee that the solution is an admissible or positive scale. When the admissible motion is detected, the electronic device performs operation 365. When the admissible motion is not detected, the electronic device performs operation 380.

In operation 365, the electronic device 101 performs a motion-triggered linear regression. Once sufficient motion is detected, a linear regression is used to solve for $\Delta t^I = s \cdot \Delta t^V$ for the scale factor s. Only solutions with a high correlation coefficient are admitted.

In operation 370, the electronic device 101 determines whether a high correlation exists between an IMU estimation and a vision-based estimation of position and orientation. When the correlation is high between the IMU estimation and the vision-based estimation, the electronic device proceeds to operation 375. When the correlation is low between the IMU estimation and the vision-based estimation, the electronic device proceeds to operation 380.

In operation 375, the electronic device 101 updates a vision scale of the pose. The electronic device can apply the vision scale or scale factor, based on a combination of the vision pose and an IMU pose in the IMU coordinate, to the vision pose. The vision scale update is described in greater detail in relation to FIGS. 10 and 11.

In operation 380, the electronic device 101 performs overlap correction on the fused pose. Since the fusion update, which includes the covariance update 330 and the state update 385, are done in a temporally distributed manner, overlap between successive fusion updates are bound to exist, and can reduce the convergence speed in the fused pose. The electronic device 101 performs overlap correction just before fusion state update 385 to prevent the slow down in convergence. The effect of overlap correction can be observed in FIG. 15.

In operation 385, the electronic device 101 updates a fusion state. The electronic device 101 can fuse the scaled vision pose and the IMU pose into a fused pose in a temporally distributed manner. The fuse posed can be used with the display. For example, the fused pose can be used to determine a location of an augmented reality (AR) object in the display. The fusion state update is described in greater detail in relation to FIGS. 12-14.

Figure 4:
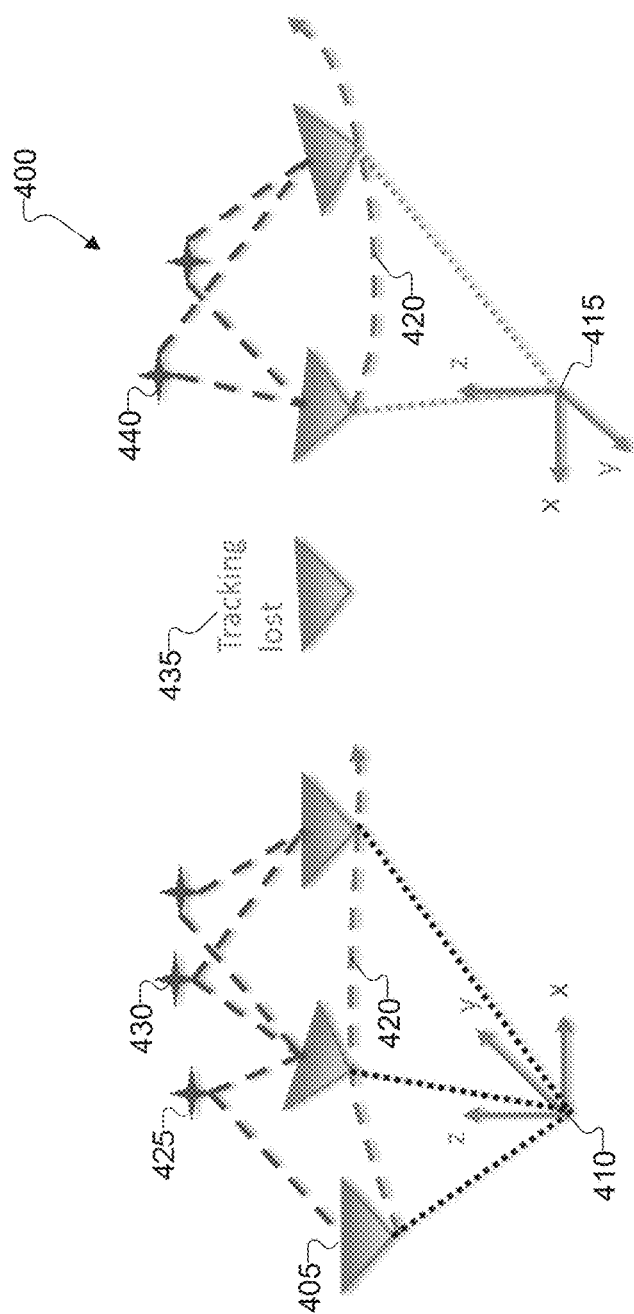
FIG. 4 illustrates an exemplary re-localization for a tracking loss according to embodiments of the present disclosure.

FIG. 4 illustrates an exemplary re-localization 400 for a tracking loss according to embodiments of the present disclosure. The embodiment of the re-localization 400 for a tracking loss shown in FIG. 4 is for illustration only. Other embodiments of an exemplary re-localization for a tracking loss could be used without departing from the scope of this disclosure.

Vision SLAM can lose tracking due to fast movements, for example. Two strategies to handle tracking loss are relocalization and reinitialization. The SLAM bases the movements of the camera 405 based on a set of original coordinates 410. Relocalization is a process for determining a position and orientation of a camera 405 after a tracking loss based on a different coordinates 415 from the original coordinates 410. Reinitialization is a process for determining a position and orientation of a camera after a tracking lost based on the original coordinates 410.

The electronic device 101 determines a set of original coordinates 410 to base a standard for expressing the movement and orientation of the camera 405 and the electronic device 101 itself. The electronic device 101 can define the initial coordinates 410 based on an original orientation of the camera. Because the camera is rarely held perpendicular to gravity and facing the north pole, the initial vision coordinates 410 are rarely in line with real-world coordinates.

As the camera 405 experiences movement 420, the position and the orientation of the camera 405 can change. The electronic device 101 continuously identifies map points 425 in sequential frames to determine the position and orientation of the camera 405 in reference to the original coordinates 410. As the camera 405 experiences movements, the additional map points 430 can be identified for further movement tracking and other maps points can be moved out of the frame. For example, in the third camera position along movement 420, the camera 405 does not capture the original map point 425, but is not in a tracking loss state due to identifying the additional map points 430.

The camera 405 can experience movement 420 to a point where tracking loss 435 occurs and the camera 405 can determine a set of new coordinates 415. Tracking loss 435 occurs when not enough map points 425 are identifiable in the captured frame. Tracking loss 435 can be caused based on quick movement of the camera 405, loss of map points 425 due to interference, etc. Once the camera 405 has determined that tracking loss 435 has occurred, the camera 405 identifies the new coordinates 415 and new map points 440.

Figure 5:
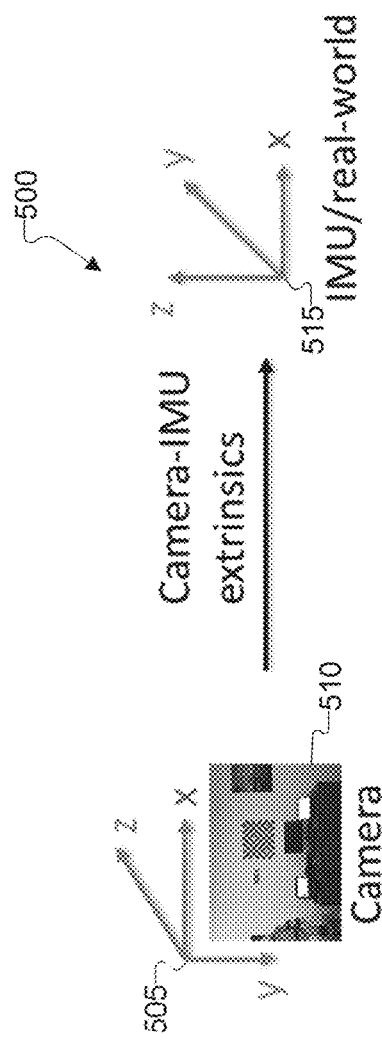
FIG. 5 illustrates an exemplary vision-to-IMU transform according to embodiments of the present disclosure.

FIG. 5 illustrates an exemplary vision-to-IMU transform 500 according to embodiments of the present disclosure. The embodiment of the vision-to-IMU transform 500 shown in FIG. 5 is for illustration only. Other embodiments of an exemplary vision-to-IMU transform could be used without departing from the scope of this disclosure.

Most cameras define a set of camera coordinates 505 of a frame 510 based on the orientation of the camera or frame. For example, the camera coordinates 505 illustrated in FIG. 5 show 'x' axis as moving from the left and right of the frame, the 'y' axis as moving from the top and bottom of the frame, the 'z' axis moving into and out of the frame.

The set of real-world coordinates 515 used by the IMU sensor can be based on gravity and other factors, for example the north pole. For example, the real-world coordinates based on gravity could have the 'z' axis point in the direction or away from detected gravity, the 'y' axis could point in the direction or away from the magnetic north pole, and the 'x' axis could be perpendicular to the direction of the 'y' axis and the 'z' axis.

The vision poses defined in the camera coordinates 505 can be transformed into the real-world coordinates 515 using the vision-to-IMU transform 500. In other words, vision data transforms the values of the vision 'x' axis to the real-world 'x' axis, the values of the vision 'y' axis to the real-world 'y' axis, and the values of the vision 'z' axis to the real-world 'z' axis. Once the transforms of the vision pose is completed, the vision data and the IMU data are aligned based on the real-world coordinates.

Figure 6:
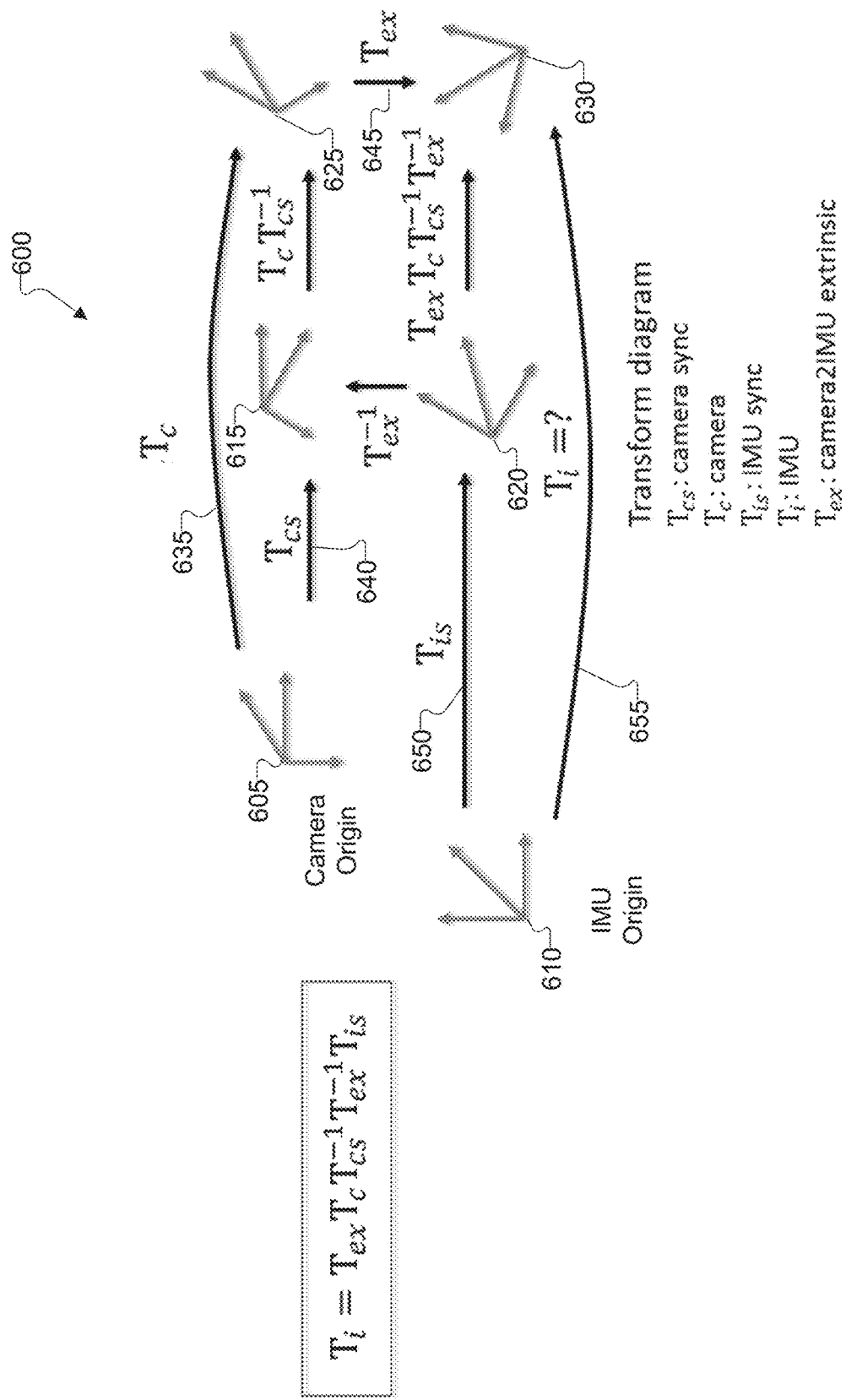
FIG. 6 illustrates an exemplary enhanced vision-to-IMU transform according to embodiments of the present disclosure.

FIG. 6 illustrates an exemplary enhanced vision-to-IMU transform 600 according to embodiments of the present disclosure. The embodiment of the enhanced vision-to-IMU transform 600 shown in FIG. 6 is for illustration only. Other embodiments of an exemplary enhanced vision-to-IMU transform could be used without departing from the scope of this disclosure.

The enhanced vision-to-IMU transform 600 is based on a camera origin coordinates 605, an IMU origin coordinates 610, a camera intermediate coordinates 615, an IMU intermediate coordinates 620, a camera final coordinates 625, and an IMU final coordinates 630.

A camera transform 635 is used for transforming the camera origin coordinates 605 to the camera final coordinates 625. A camera sync transform 640 is used for transforming the camera origin coordinates 605 to the camera intermediate coordinates 615. The camera transform 635 multiplied by the inverse of the camera sync transform 640 is used for transforming the camera intermediate coordinates 615 to the camera final coordinates 625.

A camera-to-IMU extrinsic transform 645 is used for transforming the camera final coordinates 625 into the IMU final coordinates 630. An inverse of the camera-to-IMU extrinsic transform 645 is used for transforming the IMU intermediate coordinates 620 to the camera intermediate coordinates 615.

An IMU sync transform 650 is used for transforming the IMU origin coordinates 610 to the IMU intermediate coordinates 620. The camera-to-IMU extrinsic transform 645 multiplied by the camera transform 635, the inverse camera transform 640, and the inverse camera-to-IMU extrinsic transform 645.

An IMU transform 645 is used for transforming the IMU origin coordinates 610 to the IMU final coordinates 630. The IMU transform 645 can be determined by multiplying the camera-to-IMU transform 645 by the camera transform 635, the inverse of the camera sync transform 640, the inverse of the camera-to-IMU extrinsic transform 645, and the IMU sync transform 650.

Figure 7:
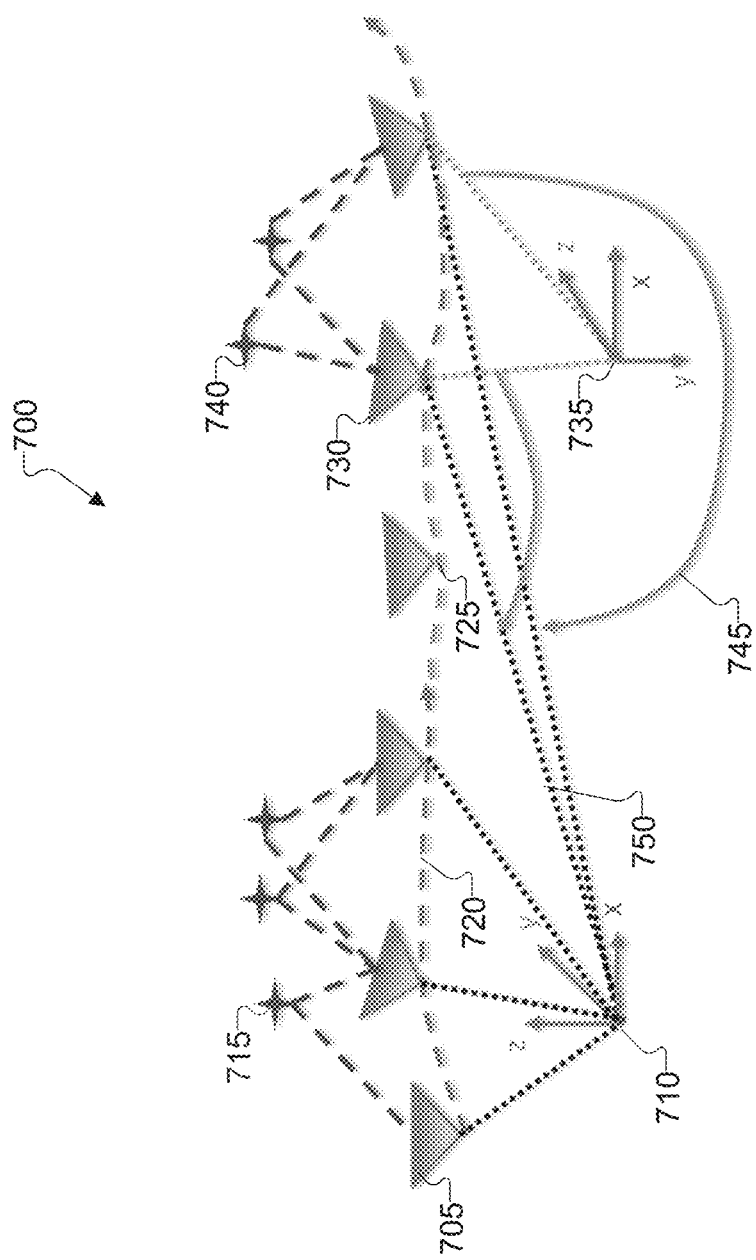
FIG. 7 illustrates an exemplary re-initialization with IMU-only pose tracking for a tracking loss according to embodiments of the present disclosure.

FIG. 7 illustrates an exemplary re-initialization 700 with IMU-only pose tracking for a tracking loss according to embodiments of the present disclosure. The embodiment of the re-initialization 700 for a tracking loss shown in FIG. 7 is for illustration only. Other embodiments of an exemplary enhanced vision-to-IMU transform could be used without departing from the scope of this disclosure.

Re-initialization 700, unlike re-localization, is able to handle the out-of-map tracking in a tracking loss scenario, and is able to maintain a consistent set or coordinates. The camera 705 determines a set of initial coordinates 710 and identifies map points 715 in a frame.

As the camera 705 experience movement 720, the camera 705 at IMU-only position 725 can no longer identify enough map points for determining the initial coordinates 710 using the vision pose. Only IMU pose extension is performed during a tracking lost experience until re-initialization can occur.

The camera 705 restarts vision tracking with a set of new coordinates 735 and new map points 740. The electronic device 101 identifies the re-initialization pose in the new coordinates 735 and performs the transform equation 745 to transform the pose back to the original coordinates 710. The pose trajectory 750 is transformed after re-initialization back to the original, real-world coordinates.

Figure 8A:
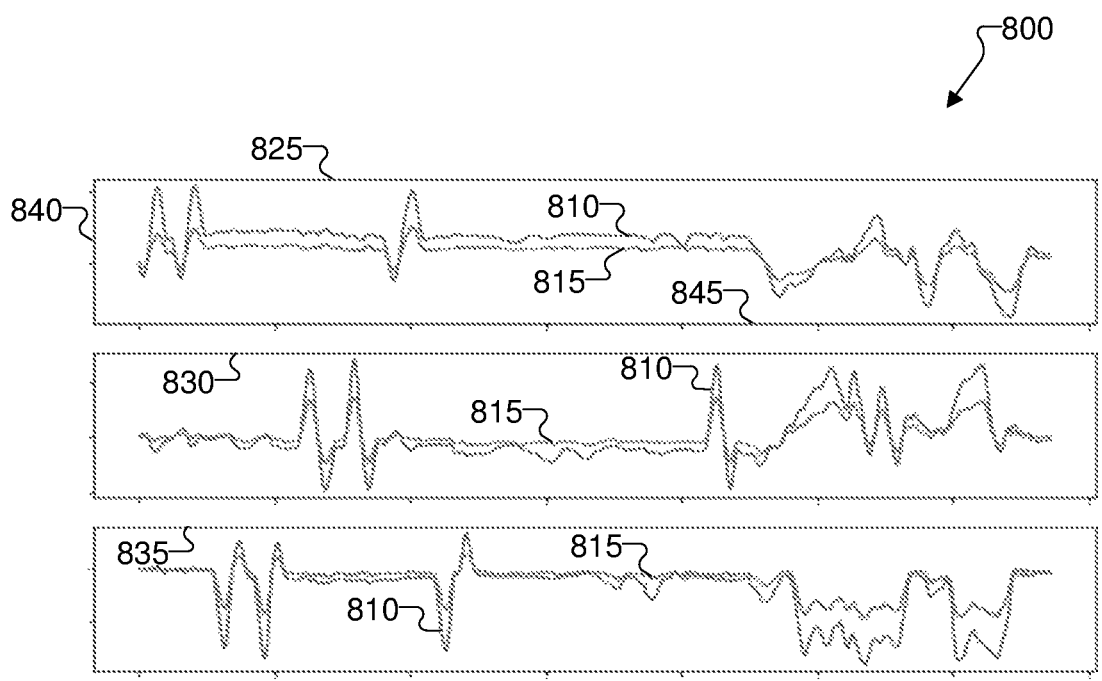
FIGS. 8A and 8B illustrate exemplary scale estimations according to embodiments of the present disclosure.
Figure 8B:
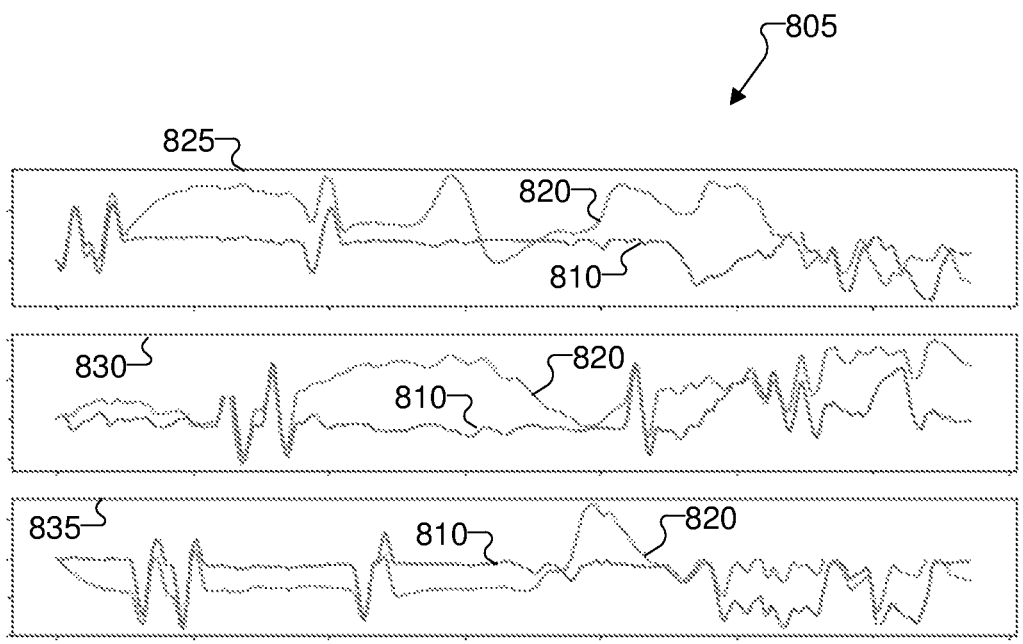

FIG. 8A illustrates an exemplary vision-only scale estimation 800 according to embodiments of the present disclosure. FIG. 8B illustrates an exemplary IMU-only scale estimation 805 according to embodiments of the present disclosure. The embodiment of the vision-only scale estimation 800 shown in FIG. 8A and the IMU-only scale estimation 805 show in FIG. 8B are for illustration only. Other embodiments of an exemplary enhanced vision-only scale estimation and IMU-only scale estimation could be used without departing from the scope of this disclosure. Both the vision-only scale estimation 800 and the IMU-only estimation 805 include an actual position 810.

The vision-only scale estimation 800 provides a vision-only position 810 and the IMU-only scale estimation 805 provides an IMU-only position 820. The vision-only scale estimation and the IMU-only scale estimation 805 include position in the x-axis graph 825, y-axis graph 830, and z-axis 835. The different graphs compare a position 840 to a time 845.

The vision translation can be up-to-scale. Monocular vision-only SLAM can normally not retrieve a metric or a true scale. The up-to-scale factor changes every time tracking is lost and handled by the initialization or re-initialization strategy. A visual-inertial SLAM can estimate a metric scale during initialization, but an error in the estimation can compound during tracking. Therefore, a one-time scale estimation is not sufficient, and continuously scale refinement during online operation is ideal.

A scale error is a function of the estimation strategy. The scale error is a function of a drift over time. The scale error is not a function of specific movements performed.

For the IMU-only scale estimation 805, the IMU allows measurements on a metric scale. The IMU estimation is susceptible to noise and drift over time. Therefore, IMU-estimation is insufficient. A combination of vision and IMU estimation is preferred for operation.

FIG. 9 illustrates exemplary dual sliding windows 900 for the scale refinement according to embodiments of the present disclosure. The embodiment of the dual sliding windows 900 shown in FIG. 9 is for illustration only. Other embodiments of exemplary dual sliding windows could be used without departing from the scope of this disclosure.

In order to use both vision and IMU for estimation, the data received from each of the camera and the IMU needs to be synchronized. The dual sliding windows 900 include sliding windows for an IMU delta translation 905 and a vision delta translation 910. Translation pairs between the IMU delta translation 905 and the vision delta translation 910 are admitted with the same sign to guarantee an admissible or a positive scale solution.

The vision delta translation $(\Delta t^V)$ 910 receives data at a slower frequency than the IMU delta translation $(\Delta t^I)$ 905. In the illustration of FIG. 9, the vision data is received over 100 ms and the IMU data is received over 5 ms. For each window of the vision data, the IMU data is aggregated over a time equal to the vision data. In the example provided, 20 sets of IMU data are received in the amount of time a single set of vision data is received. The two sets of data are compared as translation pairs to determine whether the position sign is the same to be considered admissible data.

Once sufficient motion is detected, a linear regression is used to solve for $\Delta t^I = s \cdot \Delta t^V$ for the scale factor s. Only solutions with a high correlation coefficient are admitted.

Figure 10:
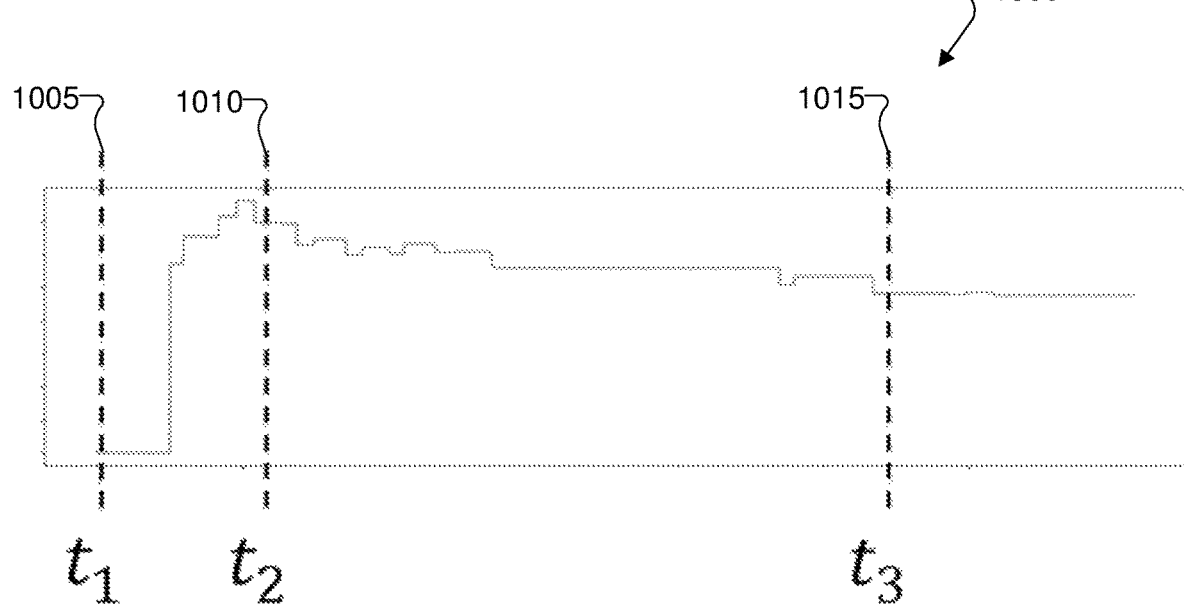
FIG. 10 illustrates an exemplary one-time scale estimation using the dual sliding windows according to embodiments of the present disclosure.

FIG. 10 illustrates an exemplary scale estimation over time 1000 using the dual sliding windows according to embodiments of the present disclosure. The embodiment of the scale estimation 1000 shown in FIG. 10 is for illustration only. Other embodiments of an exemplary scale estimation could be used without departing from the scope of this disclosure.

One time scale estimation is unable to capture proper scale value. At time $t_1$ 1005, the initialization time is fast, which makes the scale very inaccurate. At time $t_2$ 1010, the initialization time is over 25 seconds, which makes improvement to scale accuracy. At time $t_3$ 1015, the initialization time is over 2 minutes, which provides the best estimation. A one-time scale estimation is difficult to capture vision re-initialization scale changes. Online scale refinements provide the best of both option with a fast initial guess and a scale refined over time.

Figure 11:
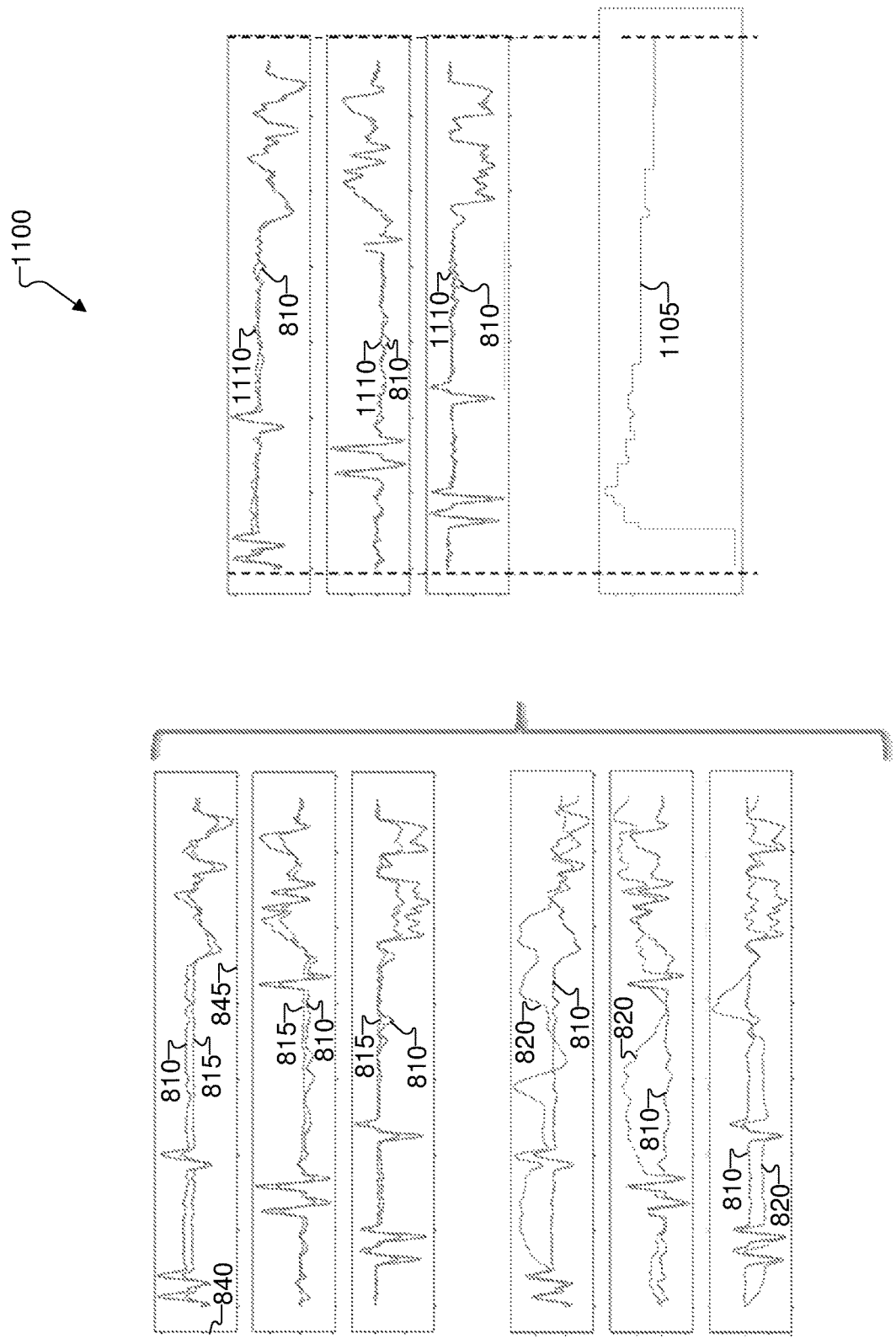
FIG. 11 illustrates an exemplary scale refinement according to embodiments of the present disclosure.

FIG. 11 illustrates an exemplary scale refinement 1100 according to embodiments of the present disclosure. The embodiment of the scale refinement 1100 shown in FIG. 11 is for illustration only. Other embodiments of an exemplary scale refinement could be used without departing from the scope of this disclosure.

As noted previously, the refined scale 1105 provides a fast initial guess and becomes refined over time. The refined scale is based on the combined estimated position 1110 and the actual position.

Figure 12:
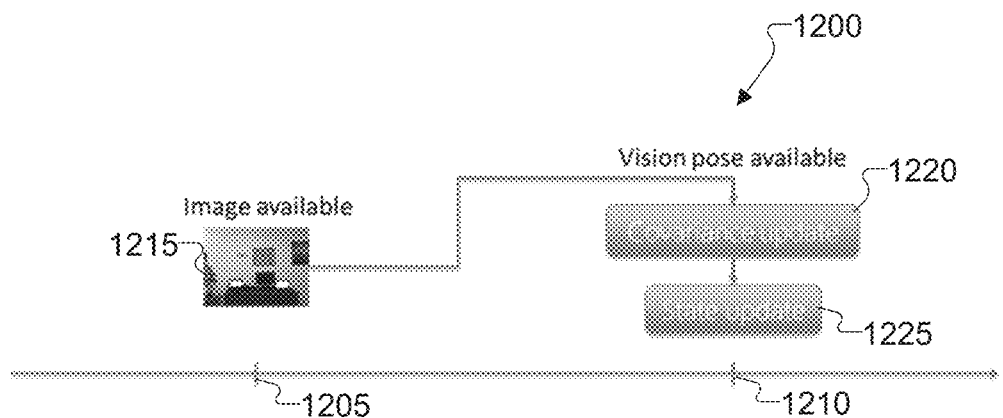
FIG. 12 illustrates an exemplary inaccurate Kalman fusion according to embodiments of the present disclosure.
Figure 13:
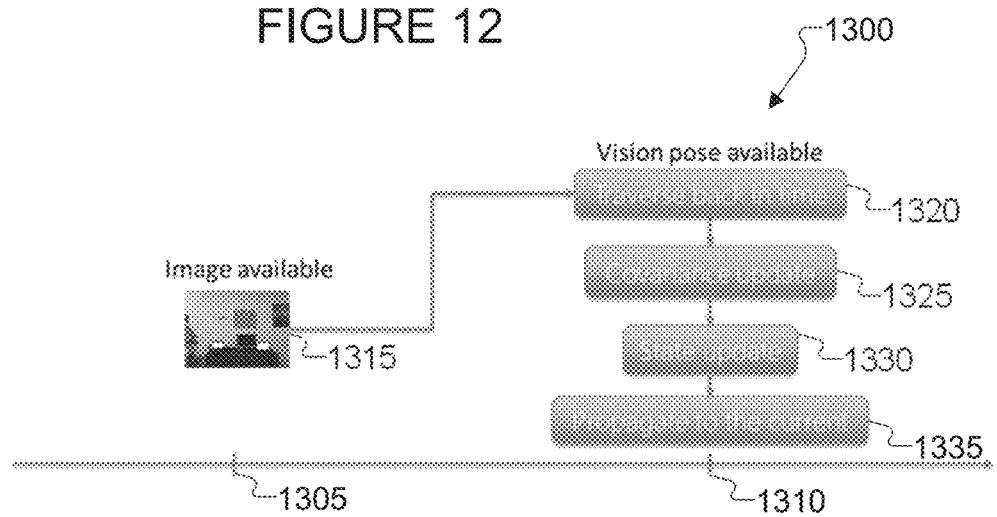
FIG. 13 illustrates an exemplary high-latency Kalman fusion according to embodiments of the present disclosure.
Figure 14:
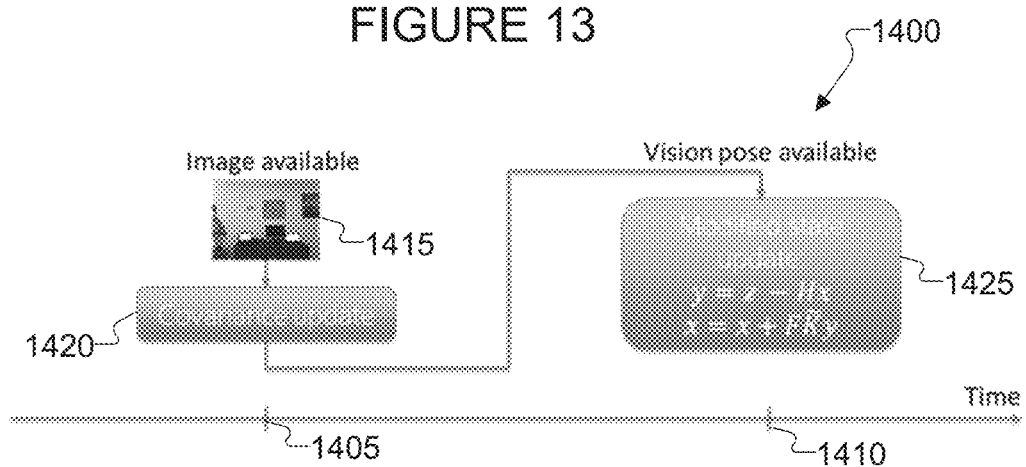
FIG. 14 illustrates an exemplary temporally distributed fusion according to embodiments of the present disclosure.

FIGS. 12-14 illustrate different temporally distributed fusions. A Kalman fusion terminology involves the following two step procedure. The first step involves a covariance update. The covariance update can use Equations 1-3.

$$S = R + HPH^T \quad \text{(Equation \#1)}$$

$$K = PH^T/S \quad \text{(Equation \#2)}$$

$$P = (I-KH)P(I-KH)^T + KK^T \cdot R \quad \text{(Equation \#3)}$$

Where S is an innovation variance (scalar), R is a prior vision measurement variance (scalar), H is a vision measurement matrix, K is a Kalman gain vector, and P is a state or estimated covariance matrix.

The second step involves a state update. The state update can use Equations 4 and 5.

$$y = z - Hx \quad \text{(Equation \#4)}$$

$$x = x + Ky \quad \text{(Equation \#5)}$$

Where y is an innovation (scalar), z is a vision measurement (scalar) and x is a state or estimate vector.

FIG. 12 illustrates an exemplary inaccurate Kalman fusion 1200 according to embodiments of the present disclosure. The embodiment of the fusion 1200 shown in FIG. 12 is for illustration only. Other embodiments of an exemplary fusion could be used without departing from the scope of this disclosure.

The fusion 1200 involves an image available time 1205 and a vision pose available time 1210. The image available time 1205 is when the image 1215 is received or captured. At the vision pose available time 1210 in fusion 1200, the covariance 1220 and the state update 1225 are performed. The fusion 1200 ignores image-to-vision pose latency, which makes the fusion 1200 inaccurate. The inaccuracy occurs due to updates should be based for an earlier time, such as the image available time 1205.

FIG. 13 illustrates an exemplary high-latency Kalman fusion 1300 according to embodiments of the present disclosure. The embodiment of the high-latency Kalman fusion 1300 shown in FIG. 13 is for illustration only. Other embodiments of an exemplary high-latency Kalman fusion could be used without departing from the scope of this disclosure.

The fusion 1300 involves an image available time 1305 and a vision pose available time 1310. The image available time 1305 is when the image 1315 is received or captured. At the vision pose available time 1310, the fusion 1300 effectively traverses back in time 1320 to the image available time 1305. The covariance update 1325 and state update 1330 are performed based on the traversed time. Once the updates are performed, the results are propagated to the current time 1335 or the vision pose available time 1310. The fusion is on the critical path, hence too many operations at once could stall an entire system, causing too many latency spikes due to the fusion. At the vision pose available time 1310, the latency can increase above the amount of time between IMU data due to the amount of operations.

FIG. 14 illustrates an exemplary temporally distributed fusion 1400 according to embodiments of the present disclosure. The embodiment of the temporally distributed fusion 1400 shown in FIG. 14 is for illustration only. Other embodiments of an exemplary temporally distributed fusion could be used without departing from the scope of this disclosure.

The fusion 1400 involves an image available time 1405 and a vision pose available time 1410. The image available time 1405 is when the image 1415 is received or captured and the covariance update is performed. The fusion 1400 has a modified state update that is performed at the vision pose available time 1410. The modified state update can use Equation 6 and 7.

$$y = z - Hx \quad \text{(Equation \#6)}$$

$$x = x + F\tilde{K}y \quad \text{(Equation \#7)}$$

where F is a dynamic or propagation matrix, and $\tilde{K}$ is a pre-update (covariance) Kalman gain. Fusion 1400 provides an accurate fusion with a reduced maximum latency. The computation of the covariance update 1420 and the modified state update 1425 are distributed over time and the bookkeeping operations are removed to maintain a less than five milliseconds latency.

Figure 15:
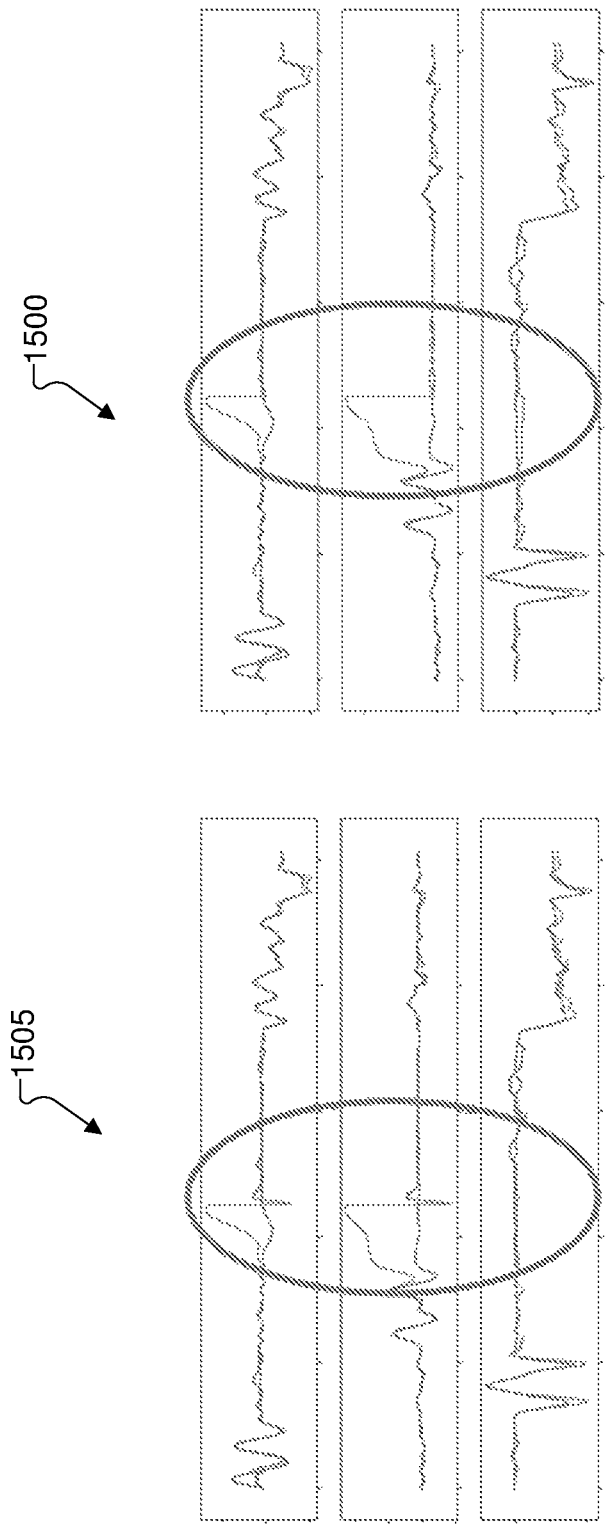
FIG. 15 illustrates an exemplary overlap correction for a temporally distributed fusion according to embodiments of the present disclosure.

FIG. 15 illustrates an exemplary overlap correction 1500 for a temporally distributed fusion according to embodiments of the present disclosure. The embodiment of the overlap correction 1500 for a temporally distributed fusion shown in FIG. 15 is for illustration only. Other embodiments of an exemplary overlap correction for a temporally distributed fusion could be used without departing from the scope of this disclosure.

Corrections 1500 are needed under overlapping fusion. For the without overlapping fusion 1505, the following times are increasing in value, with the first image in time $(t_{i1})$, the first pose out time $(t_{p1})$, the second image in $(t_{p2})$, and the second pose out $(t_{p2})$. The without overlapping fusion 1505 can be defined by the following Equations 8 and 9.

$$x_{t_{p1}} += F_{t_{i1} \to t_{p1}}(z_{t_{i1}} - Hx_{t_{i1}}) \quad \text{(Equation \#8)}$$

$$x_{t_{p2}} += F_{t_{i2} \to t_{p2}} K_{t_{i2}}(z_{t_{i2}} - Hx_{t_{i2}}) \quad \text{(Equation \#9)}$$

For the overlapping fusion 1500, the following times are increasing in value, with the first image in time $(t_{i1})$, the second image in $(t_{p2})$, the first pose out time $(t_{p1})$ and the second pose out $(t_{p2})$. The overlapping fusion 1500 can be defined by the following Equations 10 and 11.

$$x_{t_{p1}} += F_{t_{i1} \to t_{i2}} K_{t_{i1}}(z_{t_{i1}} - Hx_{t_{i1}}) \quad \text{(Equation \#10)}$$

$$x_{t_{i2}} += F_{t_{i1} \to t_{i2}} K_{t_{i1}}(z_{t_{i1}} - Hx_{t_{i1}}), x_{t_{p2}} += F_{t_{i2} \to t_{p2}} K_{t_{i2}}(z_{t_{i2}} - Hx_{t_{i2}}) \quad \text{(Equation \#11)}$$

Figure 16:
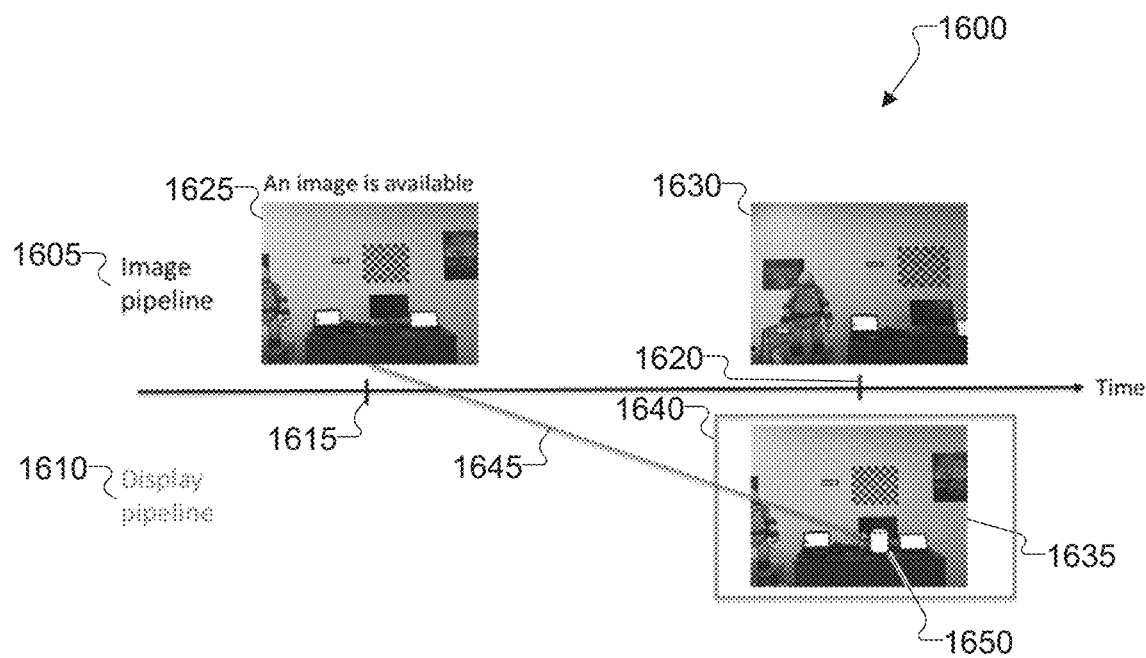
FIG. 16 illustrates an exemplary pipeline for camera previews in smartphones according to embodiments of the present disclosure.

FIG. 16 illustrates an exemplary pipeline 1600 for camera previews in smartphones according to embodiments of the present disclosure. The embodiment of the camera preview pipeline 1600 shown in FIG. 16 is for illustration only. Other embodiments of an exemplary camera preview pipeline could be used without departing from the scope of this disclosure.

The camera preview pipeline 1600 includes an image pipeline 1605 and a display pipeline 1610 at times including a first frame time 1615 and a second frame time 1620. The SLAM can have a high image-to-pose latency, which is usually hidden by the camera preview. For example, a first frame 1625 is captured at the first frame time 1615 and a second frame 1630 is captured at the second frame time 1620. The preview image 1635 is presented on display 1640. A finite time 1645 is needed to compute a pose for an AR object 1650. In latency-tolerant displays, a preview image 1635 is displays the first image time 1615 at the second image time 1620.

Figure 17:
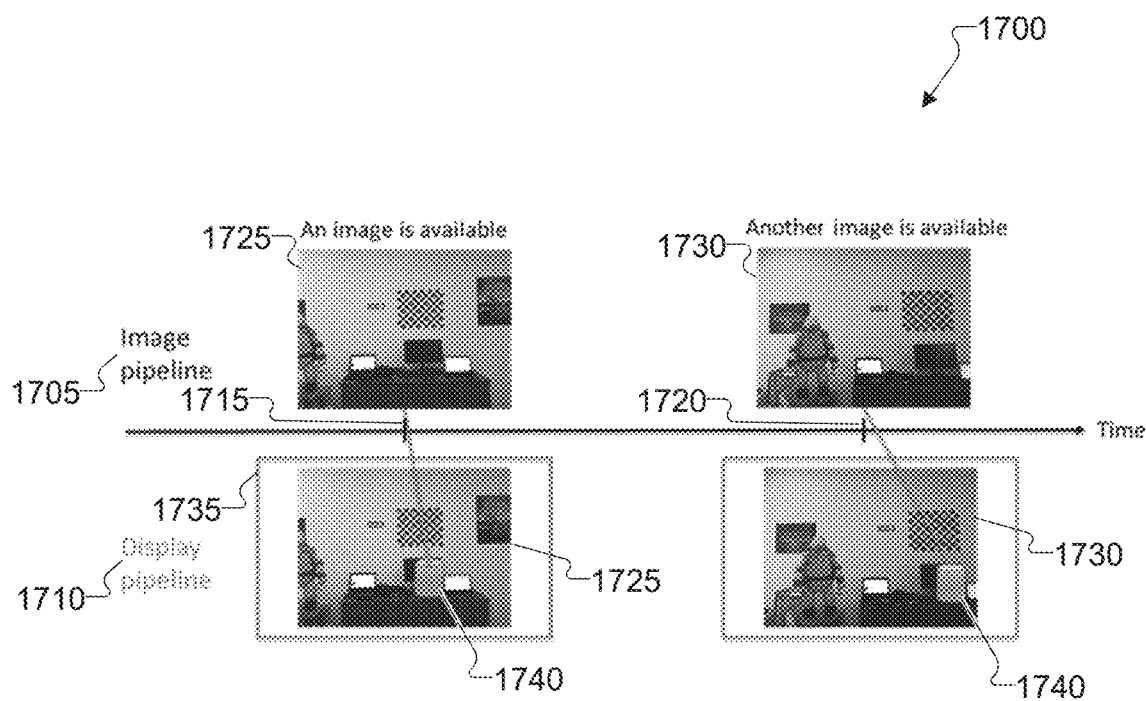
FIG. 17 illustrates an exemplary pipeline for transparent displays in smart glasses according to embodiments of the present disclosure.

FIG. 17 illustrates an exemplary pipeline 1700 for transparent displays in smart glasses according to embodiments of the present disclosure. The embodiment of the transparent display pipeline 1700 shown in FIG. 17 is for illustration only. Other embodiments of an exemplary transparent display pipeline could be used without departing from the scope of this disclosure.

The transparent display pipeline 1700 includes an image pipeline 1705 and a display pipeline 1710 at times including a first frame time 1715 and a second frame time 1720. A first frame 1725 is captured at the first frame time 1715 and a second frame 1730 is captured at the second frame time 1720. A transparent display 1735 always shows the current image. The AR object 1740 in the first frame 1725 and the second frame 1730 requires a low latency for correct positioning.

Figure 18:
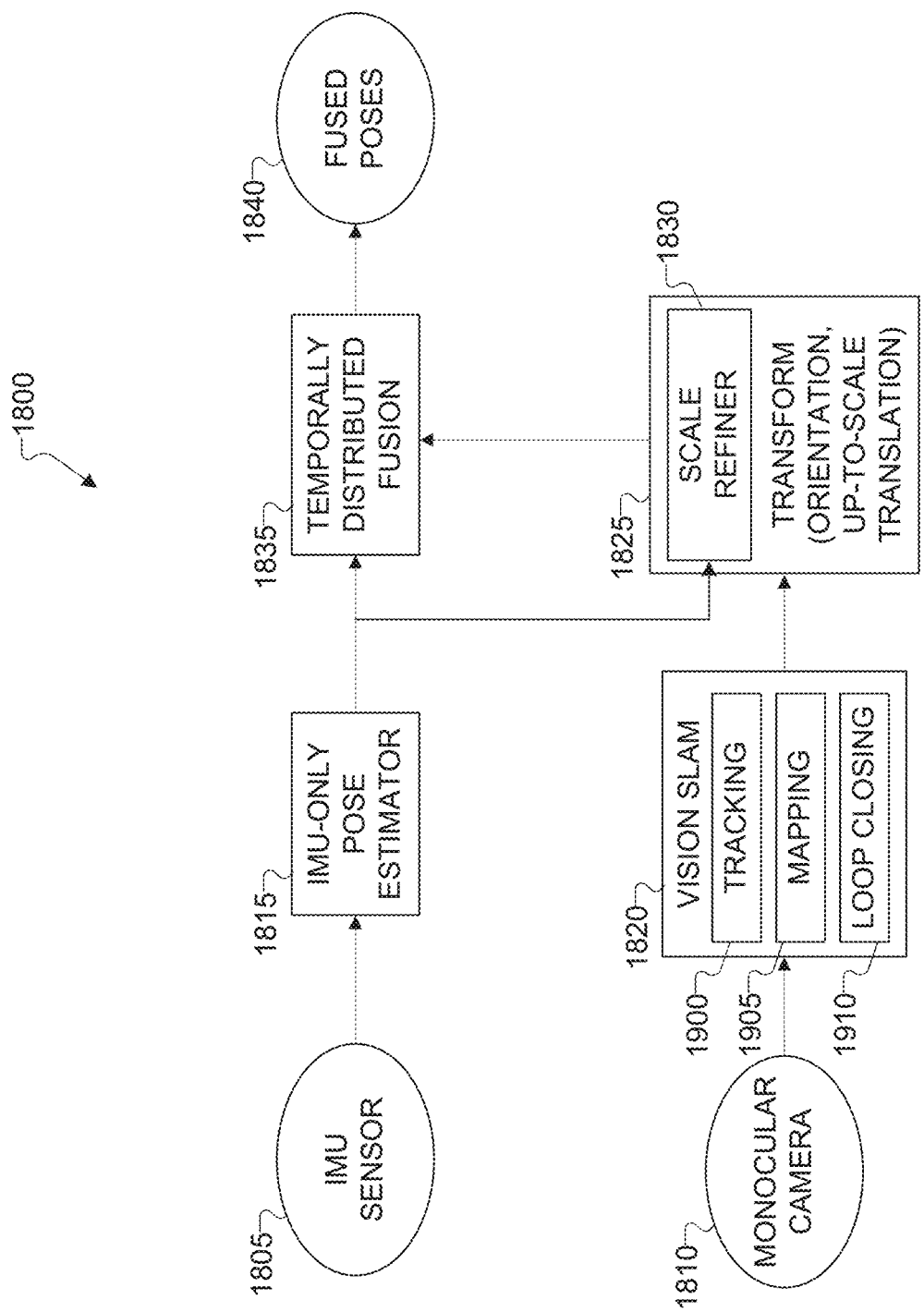
FIG. 18 illustrates a pose fusion architecture for accurate, low-latency SLAM according to the embodiments of the present disclosure.

FIG. 18 illustrates a pose fusion architecture 1800 for accurate, low-latency SLAM according to the embodiments of the present disclosure. The embodiment of the pose fusion architecture 1800 for accurate, low-latency SLAM shown in FIG. 17 is for illustration only. Other embodiments of an exemplary pose fusion architecture for accurate, low-latency SLAM could be used without departing from the scope of this disclosure.

The pose fusion architecture 1800 includes an IMU sensor 1805 and a camera 1810 in a device. The movement data captured by the IMU sensor is output to the IMU-only estimator 1815. The IMU-only estimator 1815 provides an IMU-only orientation using a method such as Mahony' proportional-integral (PI) estimator with very low drift. The IMU-only estimator 1815 provides an IMU-only translation using a state-space dynamic with biases and cross-coupling tracking to mitigate drift. The IMU-only pose estimator 1815 can perform the IMU-only translation using Equations 12-20.

$$m_1' = m_1 + w_{m_1} \quad \text{(Equation \#12)}$$

$$m_2' = m_2 + w_{m_2} \quad \text{(Equation \#13)}$$

$$a_b' = P_{a_b} \cdot a_b + (1 - P_{a_b}) \cdot a_i + w_{a_b} \quad \text{(Equation \#14)}$$

$$a_i' = P_{a_i} \cdot a_i + (1 - P_{a_i}) \cdot a_{in} \quad \text{(Equation \#15)}$$

$$a' = (a_i - a_b) + (a_{i,1} - a_{b,1}) \cdot m_1 + (a_{i,2} - a_{b,2}) \cdot m_2 \quad \text{(Equation \#16)}$$

$$v_b' = P_{v_b} \cdot v_b + (1 - P_{v_b}) \cdot v_i + w_{v_b} \quad \text{(Equation \#17)}$$

$$v_i' = v_i + a \cdot dt \quad \text{(Equation \#18)}$$

$$v' = v_i - v_b \quad \text{(Equation \#19)}$$

$$p' = p + v \cdot dt \quad \text{(Equation \#20)}$$

where $w_{m_1}$ is a noise term corresponding to $m_1$, $w_{m_2}$ is a noise term corresponding to $m_2$, $m_1$ and $m_2$ are cross-coupling terms for the other axis, $P_{a_b}$ is a probabilistic weight corresponding to $a_b$, $a_{in}$ is a gravity-free acceleration, $a_b$ is an acceleration bias, $a_{b,1}$ and $a_{b,2}$ are the acceleration biases of the other axes, $a_i$ is a nominal acceleration, $a_{i,1}$ and $a_{i,2}$ are the nominal acceleration of the other axes, a is an accelera-tion, $v_b$ is a velocity bias, $v_1$ is a nominal velocity (i.e. integrated acceleration), v is a velocity, and p is a position. Note that the IMU-only translation is processed independently for each axis. Independent processing for each axis provides for improved bias and cross-coupling tracking to improve pose accuracy, and avoid computationally expensive operation, such as matrix inversion, later in a fusion, which reduces pose latency. The probabilistic weighting provides data-driven tuning knobs to reduce noises in the estimates of biases and intermediate values, which improves pose accuracy.

The output of the vision data from the camera 1810 is used in the vision SLAM 1820. The vision SLAM 1820 involves tracking 1900, mapping 1905, and loop closing 1910, which are described in greater detail corresponding to FIGS. 19A-19C.

The scale refiner 1830 works similarly to the scale refiner 225, the transform 1825 works similarly to the coordinate transform 230, and the temporally distributed fusion 1835 work similarly to temporally distributed fusion 235. The output of architecture is fused poses 1840.

Figure 19A:
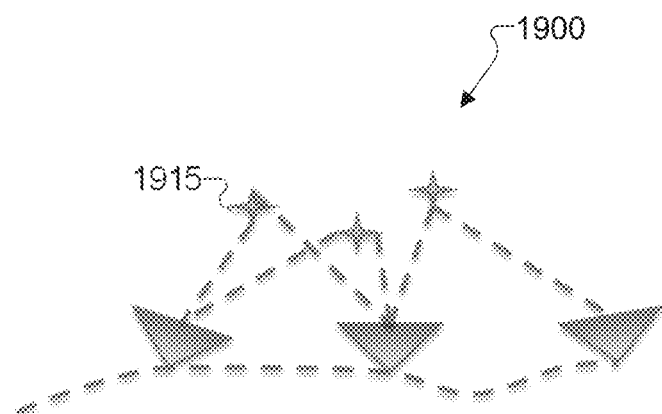
FIGS. 19A, 19B, and 19C illustrate vision SLAM threads according to the embodiments of the present disclosure.
Figure 19B:
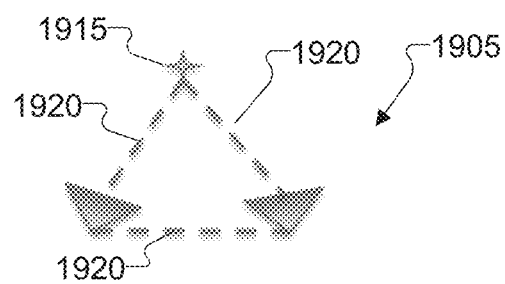
Figure 19C:
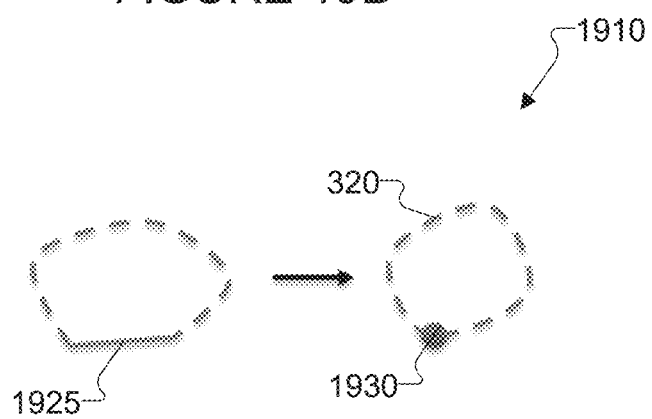

FIG. 19A illustrates an exemplary vision SLAM tracking 1900 according to embodiments of the present disclosure. FIG. 19B illustrates an exemplary vision SLAM mapping 1905 according to embodiments of the present disclosure. FIG. 19C illustrates an exemplary vision SLAM loop closing 1910 according to embodiments of the present disclosure. The embodiment of the vision SLAM tracking 1900 shown in FIG. 19A, the vision SLAM mapping 1905, and the vision SLAM loop closing 1910 show in FIG. 19C are for illustration only. Other embodiments of an exemplary vision SLAM tracking, vision SLAM mapping, and vision SLAM loop closing could be used without departing from the scope of this disclosure.

Tracking 1900 extracts ORB features as the map points 1915. The pose estimation for keyframes uses a perspective-n-point (PnP) and motion-only bundle adjustment (BA).

The mapping 1905 triangulates 1920 three-dimensional map points 1915. The mapping. The mapping 1905 uses a local BA for both motion and map points 1915.

The loop closing 1910 performs loop detection 1925 using a similarity transformation. The loop closing 1910 performs loop correction 1930 by optimizing the essential graph of the keyframes.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device comprising:
an inertial measurement unit (IMU) sensor configured to capture movement data relative to an IMU coordinate;
a camera configured to capture vision data relative to a camera coordinate;
a display; and
a processor coupled to the IMU sensor, the camera, and the display, the processor configured to:
identify map points in the captured vision data to determine a vision pose relative to the camera coordinate;
in response to not identifying a threshold amount of the map points in the captured vision data to determine the vision pose relative to the camera coordinate, re-initialize the vision pose to be relative to the camera coordinate using the captured movement data from the IMU sensor;

transform the vision pose from the camera coordinate to the IMU coordinate;

apply a scale factor, based on a combination of the vision pose and an IMU pose relative to the IMU coordinate, to the vision pose in order to generate a scaled vision pose;

fuse the scaled vision pose and the IMU pose into a fused pose in a temporally distributed manner; and output the fused pose for use with the display.

2. The electronic device of claim 1, wherein, to transform the vision pose, the processor is further configured to:

update dual sliding windows for the vision pose and the IMU pose, wherein the dual sliding windows include an IMU delta translation and a vision delta translation;

determine that the IMU delta translation and the vision delta translation are translation pairs with a same sign; and perform a linear regression using the IMU delta translation and the vision delta translation to determine the scale factor.

3. The electronic device of claim 1, wherein, to fuse the scaled vision pose and the IMU pose into the fused pose in the temporally distributed manner, the processor is further configured to:

perform overlap correction before a fusion state update; and fuse the vision pose into the fused pose based on the overlap correction.

4. The electronic device of claim 3, wherein, to transform the scaled vision pose and the IMU pose, the processor is further configured to:

independently fuse the vision pose for each axis in the IMU coordinate.

5. The electronic device of claim 1, wherein the processor is further configured to:

update a covariance of the fused pose when a new image signal is detected; and update the fused pose when a new vision pose is available.

6. The electronic device of claim 1, wherein, to re-initialize the vision pose, the processor is further configured to:

maintain IMU tracking until enough new map points are identified in new captured vision data to determine a new vision pose;

identify a new camera coordinate based on the new vision pose;

determine a transform equation between the new camera coordinate and the camera coordinate; and re-initialize the vision pose to be relative to the camera coordinate by applying the transform equation to the new vision pose.

7. The electronic device of claim 1, wherein the processor is further configured to display an augmented reality (AR) object in the display based on the fused pose.

8. A method comprising:

identifying map points in vision data captured by a camera to determine a vision pose relative to a camera coordinate, wherein the captured vision data is relative to the camera coordinate;

in response to not identifying a threshold amount of the map points in the captured vision data to determine the vision pose relative to the camera coordinate, re-initializing the vision pose to be relative to the camera coordinate using captured movement data from an inertial measurement unit (IMU) sensor, wherein the captured movement data is relative to an IMU coordinate;

transforming the vision pose from the camera coordinate to the IMU coordinate;

applying a scale factor, based on a combination of the vision pose and an IMU pose relative to the IMU coordinate, to the vision pose in order to generate a scaled vision pose;

fusing the scaled vision pose and the IMU pose into a fused pose in a temporally distributed manner; and outputting the fused pose for use with a display.

9. The method of claim 8, wherein transforming the vision pose further comprises:

updating dual sliding windows for the vision pose and the IMU pose, wherein the dual sliding windows include an IMU delta translation and a vision delta translation;

determining that the IMU delta translation and the vision delta translation are translation pairs with a same sign; and performing a linear regression using the IMU delta translation and the vision delta translation to determine the scale factor.

10. The method of claim 8, wherein fusing the scaled vision pose and the IMU pose into the fused pose in the temporally distributed manner further comprises:

performing overlap correction before a fusion state update; and fusing the vision pose into the fused pose based on the overlap correction.

11. The method of claim 10, wherein transforming the scaled vision pose and the IMU pose comprises:

independently fusing the vision pose for each axis in the IMU coordinate.

12. The method of claim 8, further comprising:

updating a covariance of the fused pose when a new image signal is detected; and updating the fused pose when a new vision pose is available.

13. The method of claim 8, wherein re-initializing the vision pose further comprises:

maintaining IMU tracking until enough new map points are identified in new captured vision data to determine a new vision pose;

identifying a new camera coordinate based on the new vision pose;

determining a transform equation between the new camera coordinate and the camera coordinate; and re-initializing the vision pose to be relative to the camera coordinate by applying the transform equation to the new vision pose.

14. The method of claim 8, further comprising displaying an augmented reality (AR) object in the display based on the fused pose.

15. A non-transitory computer readable medium embodying a computer program, the computer program comprising computer readable program code that when executed causes at least one processor to:

identify map points in vision data captured by a camera to determine a vision pose relative to a camera coordinate, wherein the captured vision data is relative to the camera coordinate;

in response to not identifying a threshold amount of the map points in the captured vision data to determine the vision pose relative to the camera coordinate, re-initialize the vision pose to be relative to the camera coordinate using captured movement data from an inertial measurement unit (IMU) sensor, wherein the captured movement data is relative to an IMU coordinate;

transform the vision pose from the camera coordinate to the IMU coordinate;

apply a scale factor, based on a combination of the vision pose and an IMU pose relative to the IMU coordinate, to the vision pose in order to generate a scaled vision pose;

fuse the scaled vision pose and the IMU pose into a fused pose in a temporally distributed manner; and output the fused pose for use with a display.

16. The non-transitory computer readable medium of claim 15, wherein the computer readable program code that when executed causes the at least one processor to transform the vision pose comprises computer readable program code that when executed causes the at least one processor to:

update dual sliding windows for the vision pose and the IMU pose, wherein the dual sliding windows include an IMU delta translation and a vision delta translation;

determine that the IMU delta translation and the vision delta translation are translation pairs with a same sign; and perform a linear regression using the IMU delta translation and the vision delta translation to determine the scale factor.

17. The non-transitory computer readable medium of claim 15, wherein the computer readable program code that when executed causes the at least one processor to fuse the scaled vision pose and the IMU pose into the fused pose in the temporally distributed manner comprises computer readable program code that when executed causes the at least one processor to:

perform overlap correction before a fusion state update; and fuse the vision pose into the fused pose based on the overlap correction.

18. The non-transitory computer readable medium of claim 17, wherein the computer readable program code that when executed causes the at least one processor to transform the vision pose and the IMU pose comprises computer readable program code that when executed causes the at least one processor to:

independently fuse the vision pose for each axis in the IMU coordinate.

19. The non-transitory computer readable medium of claim 15, wherein the computer program further comprises computer readable program code that when executed causes the at least one processor to:

update a covariance of the fused pose when a new image signal is detected; and update the fused pose when a new vision pose is available.

20. The non-transitory computer readable medium of claim 15, wherein the computer readable program code that when executed causes the at least one processor to re-initialize the vision pose comprises computer readable program code that when executed causes the at least one processor to:

maintain IMU tracking until enough new map points are identified in new captured vision data to determine a new vision pose;

identify a new camera coordinate based on the new vision pose;

determine a transform equation between the new camera coordinate and the camera coordinate; and re-initialize the vision pose to be relative to the camera coordinate by applying the transform equation to the new vision pose.

\* \* \* \* \*